(12) United States Patent
Shimamoto

(10) Patent No.: US 6,304,821 B1
(45) Date of Patent: Oct. 16, 2001

(54) NAVIGATION DEVICE AND METHOD THEREFOR

(75) Inventor: Yoshinobu Shimamoto, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/671,204

(22) Filed: Sep. 28, 2000

Related U.S. Application Data (63) Continuation of application No. PCT/JP99/00365, filed on Jan. 28, 1999.

(51) Int. Cl.⁷ .................................................. G01C 21/34
(52) U.S. Cl. ........................ 701/209; 701/210; 340/990; 340/995
(58) Field of Search .................................. 701/200, 202, 701/207, 208, 209, 210; 73/178 R; 340/988, 990, 995

(56) References Cited

U.S. PATENT DOCUMENTS

| | | | |
|---|---|---|---|
| 5,406,490 | * 4/1995 | Braegas | 701/210 |
| 5,428,545 | * 6/1995 | Maegawa et al. | 701/210 |
| 5,845,227 | * 12/1998 | Peterson | 701/209 |
| 5,862,509 | * 1/1999 | Desai et al. | 701/210 |
| 5,892,463 | * 4/1999 | Hikita et al. | 701/209 |
| 5,911,773 | * 6/1999 | Mutsuga et al. | 701/210 |
| 5,983,158 | * 11/1999 | Suzuki et al. | 701/210 |
| 6,064,926 | * 5/2000 | Sarangapani et al. | 701/210 |

FOREIGN PATENT DOCUMENTS

| | | |
|---|---|---|
| A60125879 | 7/1985 | (JP) . |
| A5134603 | 5/1993 | (JP) . |
| A7229746 | 8/1995 | (JP) . |
| A095100 | 1/1997 | (JP) . |

* cited by examiner

*Primary Examiner*—Gary Chin (57) ABSTRACT

A microcomputer 4 is provided which searches a recommended route which can be negotiated in a minimum time from a present position of a moving body detected by a GPS receiver 1 to a destination set by a operational device 3 by reference to obstacle time information played from a CD-ROM player 2.

26 Claims, 6 Drawing Sheets

| ROAD NUMBER | INITIAL NUMBER | FINAL NUMBER | INITIAL COORDI- NATES | FINAL COORDI- NATES | ACTUAL DIS- TANCE | SPEED LIMIT | RE- QUIRED TIME | CROSSING POSITION | CROSSING NUMBER |
|---|---|---|---|---|---|---|---|---|---|
| D1 | N1 | N2 | X1,Y1 | X2,Y2 | 10km | 60km/h | 10min. | 0 | 0 |
| D2 | N2 | N3 | X2,Y2 | X3,Y3 | 10km | 60km/h | 10min. | 0 | 0 |
| D3 | N3 | N4 | X3,Y3 | X4,Y4 | 10km | 60km/h | 10min. | 0 | 0 |
| D4 | N4 | N6 | X4,Y4 | X6,Y6 | 10km | 60km/h | 10min. | 0 | 0 |
| D5 | N2 | N5 | X2,Y2 | X5,Y5 | 10km | 60km/h | 10min. | N5 | F3 |
| D6 | N5 | N6 | X5,Y5 | X6,Y6 | 10km | 60km/h | 10min. | N5 | F3 |
| D7 | ... | ... | ... | ... | ... | ... | ... | ... | ... |
| ... | ... | ... | ... | ... | ... | ... | ... | ... | ... |

FIG.4

| CROSSING NUMBER | COOR-DINATE | CLOSURE START TIME 1 | CLOSURE FINISH TIME 1 | CLOSURE START TIME 2 | CLOSURE FINISH TIME 2 | ... |
|---|---|---|---|---|---|---|
| F1 | ... | ... | ... | ... | ... | ... |
| F2 | ... | ... | ... | ... | ... | ... |
| F3 | X5,Y5 | 7:00 | 7:20 | 8:00 | 8:20 | ... |
| F4 | ... | ... | ... | ... | ... | ... |
| F5 | ... | ... | ... | ... | ... | ... |
| ... | ... | ... | ... | ... | ... | ... |
| ... | ... | ... | ... | ... | ... | ... |

FIG.6

NAVIGATION DEVICE AND METHOD THEREFOR

CROSS-REFERENCE TO THE RELATED APPLICATION

This Application is a continuation of International Application No. PCT/JP99/00365, whose International filing date is Jan. 28, 1999, the disclosures of which Application are incorporated by reference herein.

BACKGROUND OF THE INVENTION

1. Field of the Invention

The present invention relates to a navigation device and method therefor which displays a recommended route which can be accomplished with reference to the shortest timeframe, when searching a route from a present position to a destination.

2. Description of the Related Art

Navigation devices for use in a moving body, for example an automobile, have recently enjoyed increasing popularity. Such devices calculate a recommended route from a present position of the vehicle to a destination on the basis of a destination set by a user. The recommended route is then displayed. Some devices provide for indicating the direction of turning with voice commands so that the route may be correctly selected at the next intersection.

Devices which have the function of searching for recommended routes entail the problem of searching for the route on the basis of some kind of standard. Normally this is defined as a route which is "short" with respect to distance or time. However the selection of the shortest route with respect to time entails the use of expressways and the resultant problem of increases in tolls. It is difficult to search for a route in consideration of all parameters. Normally a method of selecting a route, which satisfies a user, is adopted in which the user selects each condition in order of priority.

The present invention proposes an improvement related to a device which searches a route on the basis that travelling time is prioritized. When applied to an automobile, the present invention prioritizes time by analyzing the speed limits set on each road divided into a number of sections. The recommended route is assumed to be the combination of routes having the smallest total for the time required for the divided sections.

However if there is an obstacle such as a railway crossing along such a route which delays the passage of the moving body, the route as calculated above may not be the shortest route as regards time and a detour may be shorter.

An invention which addresses the above problem is disclosed for example in JP-A-9-5100. In this invention, the presence of railway crossings and the timetables of main stations are included in road data. When a route is searched on roads which have railway crossings, routes which include railway crossings with long waiting times are excluded by a weighting process which corresponds to the number of trains passing in unit time.

In this way, the effect of waiting time at railway crossings may be reduced and a destination may be reached generally within a fixed time. However the problem has arisen that the reliability of recommended routes displayed is low due to the fact that it is not possible to determine whether or not a given railway crossing will actually delay the passage of the moving body.

JP-A-7-229746 discloses a device in which the timetables of all modes of transportation are stored. This enables an estimation of the waiting time at railway crossings which intersect with the road by displaying superimposed timetables on the road map in conjunction with the progress of the moving body.

However the above device simply displays timetables and thus the driver or passenger must determine whether it would be quicker to wait at the railway crossing or to make a detour. Such decisions are difficult for a person riding in a moving body and in particular safety considerations arise by a driver being distracted by such decisions.

Since conventional navigation devices are constructed as above, it is possible to select a route on the basis of the presence of an obstruction such as a railway crossing. However the probability that the recommended route is the shortest route is low due to the fact that displayed recommended routes do not consider the amount of time for which the vehicle may actually be delayed.

SUMMARY OF THE INVENTION

The present invention is proposed to solve the above problems and has the object of providing a navigation device and method therefor which can increase the searching accuracy for a recommended route along which a vehicle can travel in the shortest time.

The navigation device of the present invention is provided with a route searching means which refers to delay time information which is obtained from an information acquisition means and which searches for a recommended route along which movement is possible in the shortest time from a present position of a moving body detected by a detection means to a destination which is set by a setting means.

In this way, the effect is obtained of increasing the searching accuracy of a recommended route along which movement is possible in the shortest time from a present position to a destination.

The navigation device of the present invention is provided with a route-searching device. When in a time range in which the forecast time for the vehicle to reach an obstacle will result in a delay, the route searching device searches a recommended route by adding waiting time, which is the time at which the vehicle will pass, to the time taken for the vehicle to travel from a present position to a destination.

In this way, it is possible to search a recommended route on the basis that an obstacle exists.

The navigation device of the present invention is provided with an information acquisition means which reads obstacle time information from a recording medium.

In this way, it is possible to acquire obstacle time information in a simple manner.

The navigation device of the present invention is provided with an information acquisition means which receives radio signals relating to obstacle time information.

In this way, it is possible to increase the accuracy of route searching for a recommended route even when a train schedule is revised or when an accident has occurred which has resulted in the re-scheduling of services.

The navigation method of the present invention consists of searching for a the shortest recommended route with respect to time from a present position to a destination by referring to obstacle time information about obstacles on the route.

In this way, it is possible to increase the searching accuracy of a recommended route along which it is possible to travel in the shortest time from a present position to a destination.

The navigation method of the present invention consists of searching a recommended route by adding waiting time, which is the time by which a vehicle can pass an obstacle, to the time taken for the vehicle to travel from a present position to a destination, when the vehicle is in a time range in which the forecast time of the vehicle to reach an obstacle will result in a delay.

In this way, it is possible to search a recommended route in consideration of the existence of an obstacle.

The navigation method of the present invention consists of reading obstacle time information from a recording medium.

In this way, it is possible to acquire obstacle time information in a simple manner.

The navigation method of the present invention consists of receiving a radio signal related to obstacle time information.

In this way, it is possible to increase the searching accuracy of a recommended route even when the train timetable is revised or when an accident has resulted in the re-scheduling of services.

DETAILED DESCRIPTION OF THE PREFERRED EMBODIMENTS

In order to explain the invention in greater detail, the preferred embodiments are discussed below with reference to the accompanying figures.

Embodiment 1

Figure 1:
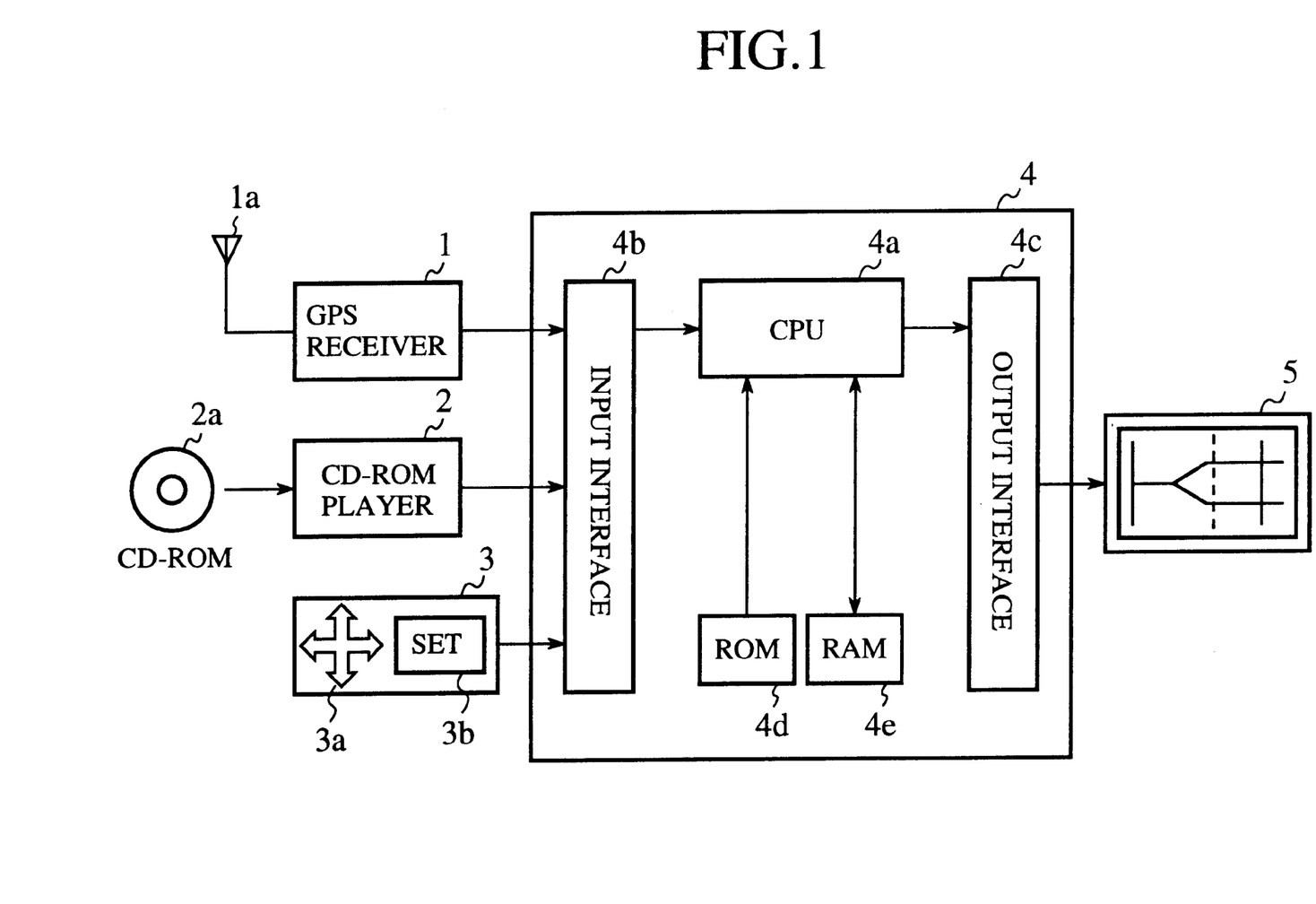
FIG. 1 is a schematic diagram showing a navigation device according to a first embodiment of the present invention.

FIG. 1 is a diagram showing the navigation device according to a first embodiment of the present invention. In the figure, reference numeral 1 denotes a known GPS receiver (position detection means) which detects a present position of the moving body (for example an automobile). The GPS receiver receives positional information from a GPS satellite via an antenna 1a. 2 is a CD-ROM playing device (information acquisition means) which acquires map information which is geographical information regarding roads, railways, railway crossings and the like and which acquires obstacle time information regarding obstacles (for example railway crossings) on the route which are in a delaying time range. Obstacle time information and map information are recorded in the CD-ROM 2a which acts as a recording medium.

3 is an operation device (setting means) which sets the destination of the vehicle and which consists of a cursor displacement device 3a and a set button 3b. 4 is a microcomputer (route searching means) which searches the shortest recommended route with respect to time taking into account obstacles such as railway crossings from a present position to a destination based on information from a GPS receiver 1, CD-ROM player 2 and an operation device 3. The microcomputer 3 comprises a CPU 4a, an input interface 4b, an output interface 4c, a ROM 4d and a RAM 4e. 5 is an LCD panel (display means) which displays information relating a recommended route searched by the microcomputer 4.

Figure 2:
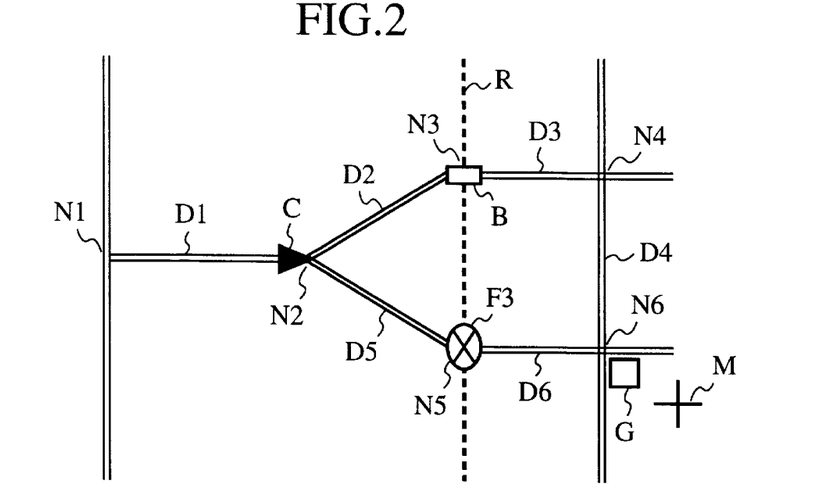
FIG. 2 is an explanatory diagram showing a map displayed on an LCD panel.

FIG. 2 shows an example of a road map displayed on the LCD panel 5. D1–D6 are roads, N1–N6 are initial or terminal points of roads, R is a railway, B is a bridge for the road D2, D3 to cross a railway R, F3 is a railway crossing, C is a mark showing the present position of the vehicle, G is a mark showing a destination, and M is the cursor of the operation device 3.

Figure 3:
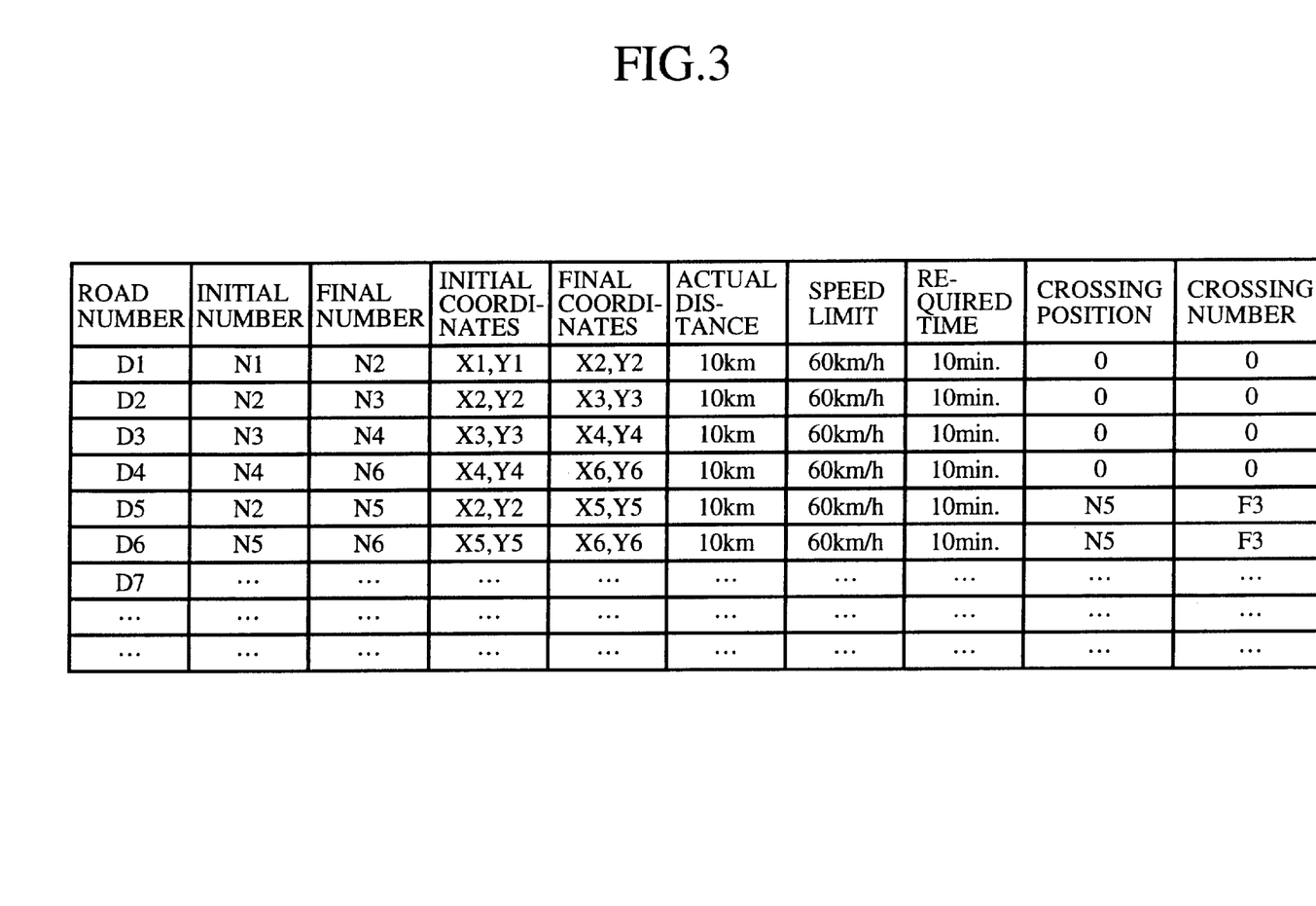
FIG. 3 is a table showing a memory map of map information recorded on a CD-ROM.

A memory map in the form as shown in FIG. 3 is stored in the CD-ROM with map information, and more particularly road information, for the purposes of generating the above map.

Figure 4:
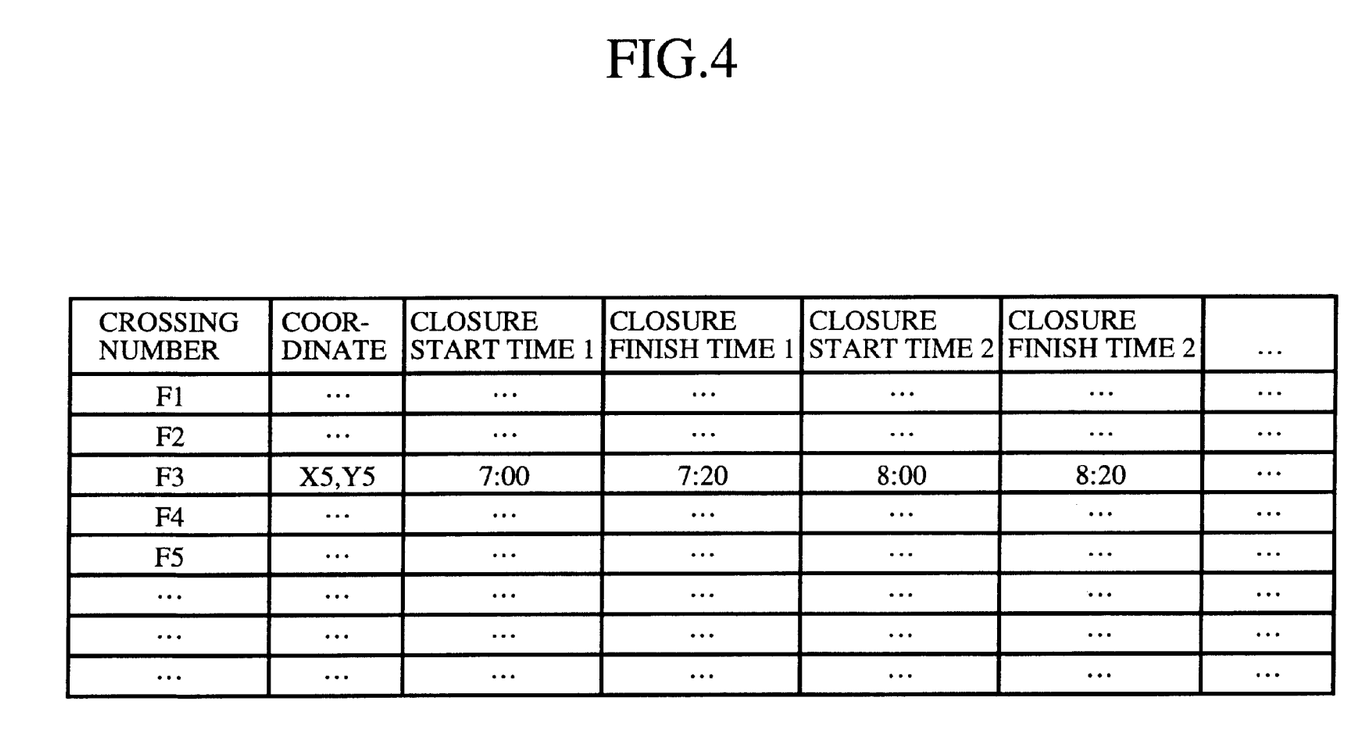
FIG. 4 is a table showing a memory map of obstacle time information relating to railway crossings recorded on a CD-ROM.

For example, a road D1 comprises the line from the initial point N1 to the terminal point N2. The coordinates of the initial and terminal points N1 and N2 are the respective coordinates (X1, Y1), (X2, Y2). The actual distance is displayed as 10 km, the speed limit as 60 km/h) and railway crossing positions as "0" that is to say there are no railway crossings. The road depicted in FIG. 2 is created on the basis of the above road information. Furthermore as the toad D5 has data "N5" stored showing the position of a railway crossing, the crossing at the terminal point N5 is displayed as "YES". By referring to the time information for railway crossings shown in the memory map in FIG. 4 which is recorded on the CD-ROM 2a, it can be understood from the crossing number "F3" and the crossing coordinates (X5, Y5) that the initial closure time 1 is 7:00 and the opening time is 7:20.

The operation of the invention will be explained below.

Figure 5:
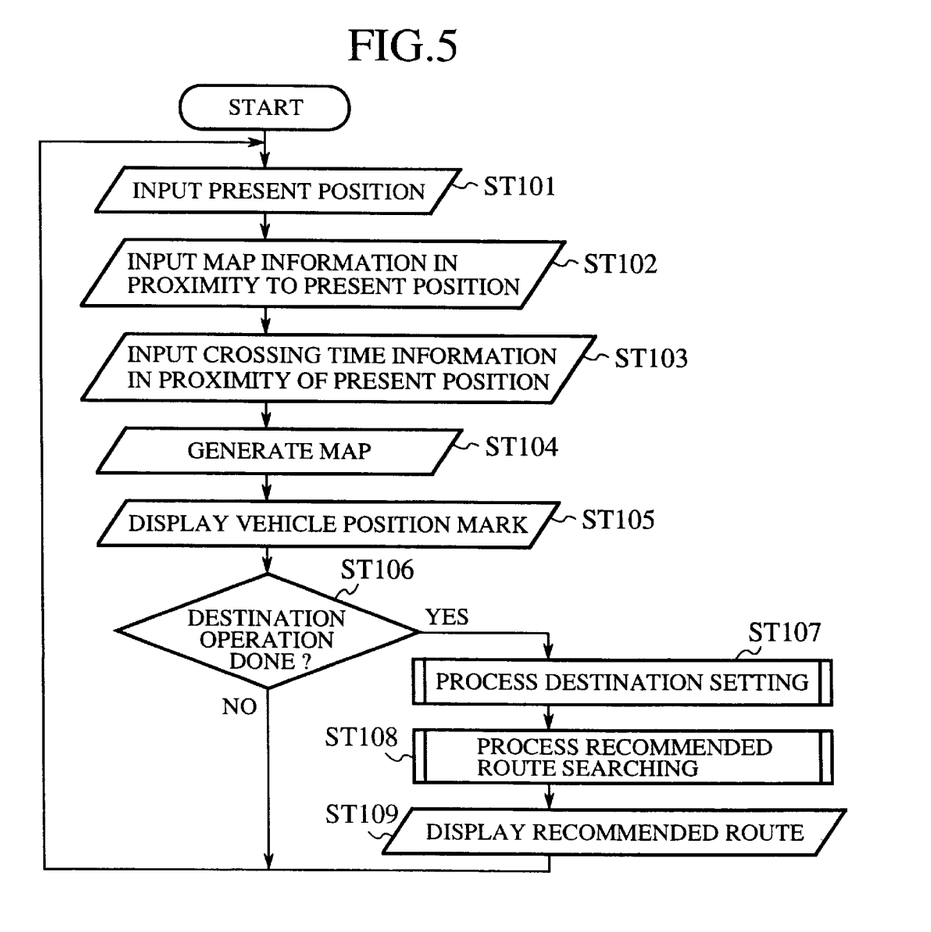
FIG. 5 is a flowchart of a main routine showing the operation of a program stored on the ROM of a microcomputer.
Figure 6:
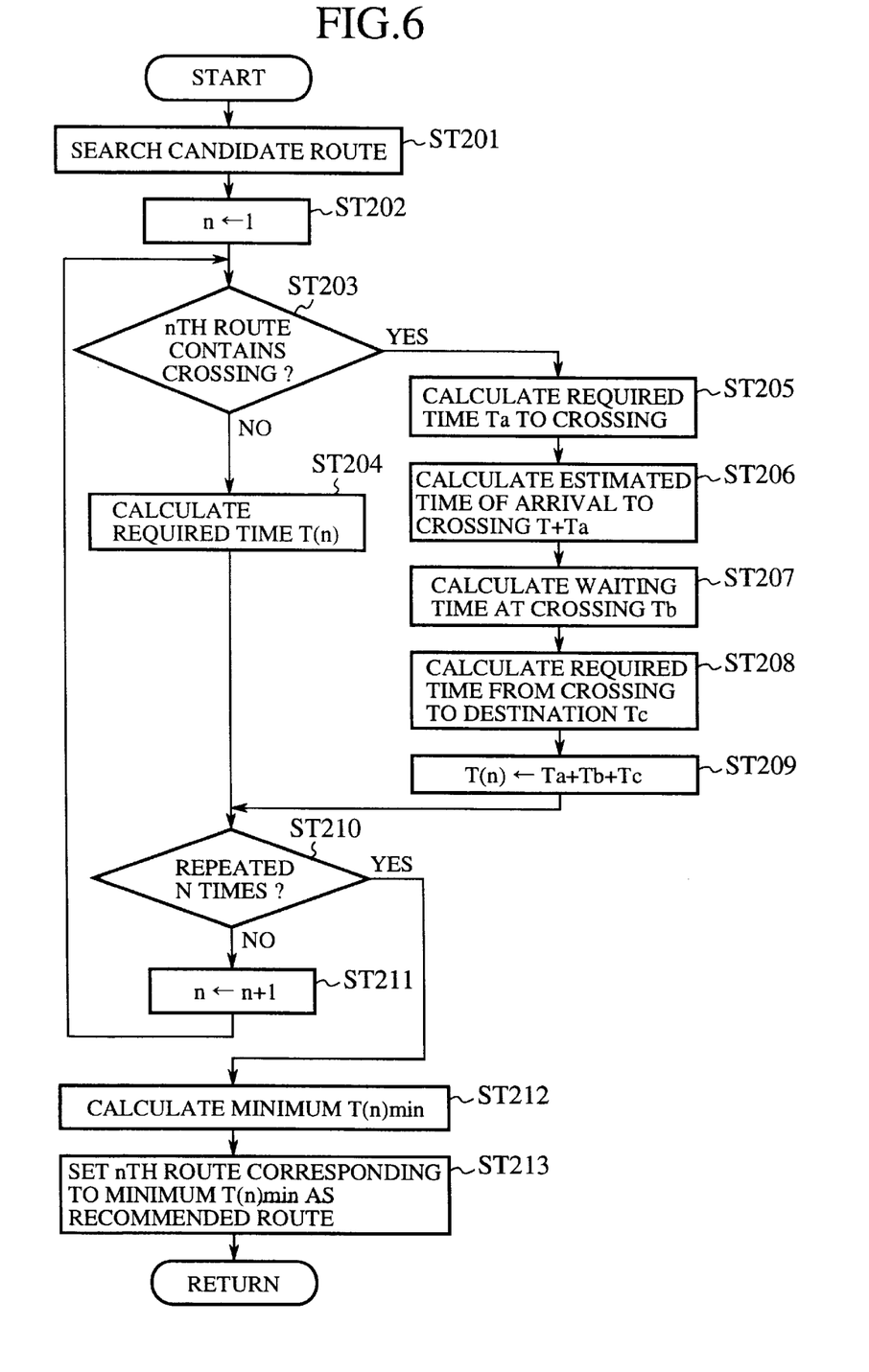
FIG. 6 is a flowchart of a sub-routine showing the operation of a program stored on the ROM of a microcomputer.

FIGS. 5 and 6 are flowcharts which show the operation of the microcomputer 4.

Firstly in a step ST101 in FIG. 5, the GPS receiver 1 inputs coordinates (X, Y) representing the present detected position of the vehicle. Next in a step ST102, map information regarding the surroundings of the present position are input from the CD-ROM player 2. Next in a step ST103, time information relating to railway crossings in the vicinity of the present position is input from the CD-ROM player 2. Next in a step ST104, map information from the CD-ROM player 2 is displayed on the LCD panel 5. In this way, the roads D1–D6, the railway crossings F3, the bridge B, the railway R and the like as shown in FIG. 2, are created. Then in a step ST105, a mark C which displays a present position of the vehicle is displayed on the LCD panel 5 (refer to FIG. 2). Then in a step ST106, it is detected whether or not the operation device is operating. In the event that it is not operating, the routine is repeated by returning to the step ST101. If it is operating, the destination is set (step ST107).

In step ST107, the destination is set and the destination mark G is created by the user moving the cursor M displayed on the LCD panel 5 (refer to FIG. 2) with the cursor operation device 3a and pushing the set button 3b at a desired position.

In a step ST108, searching of a recommended route is performed. As shown in detail in FIG. 6, firstly in a step ST201, a candidate route is searched from a current position of the vehicle C to a destination D. The example shown in FIG. 2 shows two types of route from the present position C to a destination D. In other words, a first route is D5, D6 and a second route is D2, D3, D4. When the condition of travelling from the present. position C to the destination G in the shortest distance is placed on the search, the total distance of each route is calculated from actual distance data acquired from the map information shown in FIG. 3 with the result that the first route is 20 km and the second route is 30 km long. Thus the first route can be seen to be the shortest. If for example there is no railway crossing F3 along the first route, the required time for the first route will be calculated as 20 minutes and that of the second route as 30 minutes on the basis of the speed limits for the roads shown in FIG. 3. Thus the first route is the one that enables arrival in the shortest time.

However actually, since there is a railway crossing F3 along the first route, if the railway crossing F3 is open when the vehicle arrives at the railway crossing F3, it is possible to arrive at the destination in a shorter maximum time than the second route. If the vehicle arrives at the railway crossing just when it is closing, the necessary time to travel from a present position to the destination G will be 40 minutes as waiting time will amount to 20 minutes. Therefore selecting the first route which contains the railway crossing F3 may produce longer or shorter travelling times than the second route depending on the time at which the vehicle reaches the crossing.

The first embodiment is adapted to allow normal arrival in a minimum time at a destination on the basis of the processing shown in FIG. 6. Firstly in a step ST201, a candidate route is searched, and as a result, a number of routes N from a first route to a destination is extracted. Next in a step ST202, an initial value 1 is set as a parameter n to make repeated calculations. Next in a step ST203, it is determined whether a railway crossing is contained in the nth route. If one is not contained, in a step ST204, necessary travelling time is calculated from the map information in FIG. 3. The necessary travelling time for the nth route is taken to be T(n).

When it is determined in a step ST203 that the nth route contains a railway crossing, in a step ST205, the necessary travelling time Ta from the present position of the vehicle to the railway crossing F3 is calculated. The estimated time of arrival at the crossing T+Ta is calculated by adding the current travelling time T to this time Ta. Then in a step ST207, a railway crossing waiting time Tb is calculated based on estimated time of arrival at the crossing T+Ta and the crossing time information in FIG. 4. In a step ST208, the necessary travelling time Tc from a crossing F3 to a destination G is calculated. Then in a step ST209, the sum of the respective times Ta, Tb, Tc is calculated and the required time from a present position of a vehicle at that time to a destination G is calculated.

After the step ST204 or the step ST209 has been executed, in a step ST210, it is determined whether or not the above calculation has been executed N times to the Nth route. If it has not, in a step ST211, the parameter n is renewed. If it has, in a step ST212, the minimum required travelling time T(n) min is calculated on the entire route from a first route to an Nth route. In a step ST213, an nth route which corresponds to the minimum required time T(n) min is set as a recommended route. The routine returns to the step ST109 in the main routine in FIG. 5 and displays a route which corresponds to T(n) min. The display method entails for example, widening the line representing the roads D5, D6 if they are assumed to be a recommended route so that they are wider than other roads. Otherwise such roads may be depicted in a preset highlighting color in order to distinguish them from other roads or may be distinguished by other methods.

A concrete example of the above operation will now be explained. Firstly if the present position of the vehicle is taken to be the point N2, when the time T is 6:55, since the required time Ta to the crossing as calculated in the step ST 205 is 10 minutes, the estimated time of arrival T+Ta at the crossing calculated in the step ST 206 is 7:05. By reference to the crossing time information in FIG. 4, it is calculated that the vehicle will encounter the closing period of the crossing from 7:00 to 7:20 and so the railway crossing waiting time Tb will be 15 minutes. Since the required time Tc from the crossing F3 to the destination G is calculated to be 10 minutes from the map information in FIG. 3, the total required time T(1) is calculated to be 35 minutes in the step ST209.

On the other hand, the required time T(2) on the second route calculated in the step ST204 is calculated to be 30 minutes with reference to the map information in FIG. 3. When, the vehicle leaves the point N2 at 6:55, since the second route D2, D3, D4 which passes the bridge B has a shorter minimum travelling time than the first route D5, D6 which passes the crossing F3, in the step ST212, the second route D2, D3, D4 is set as the recommended route.

In the same way as the above, when the present position of the vehicle is taken to be N2 and the time T is 7:05, since the Ta calculated in the step ST205 is 10 minutes as above, the estimated time of arrival T+Ta at the crossing calculated in the step ST206 is 7:15. With reference to the crossing information in FIG. 4, on the basis of this time, the vehicle will encounter the same crossing closure period from 7:00 to 7:20. Thus the crossing F3 waiting time will be 5 minutes. Next since the required time Tc from the crossing F3 to the destination G is the same 10 minutes, the total required time T(1) calculated in the step ST209 is 25 minutes.

Since the required time T(2) on the second route is the 30 minutes as above, when the vehicle leaves from the point N2 at 7:05, since the first route which passes the crossing F3 has a shorter minimum travelling time than the second route which passes the bridge B, the first route D5, D6 is set in the step ST 213 as the recommended route.

When the estimated time of arrival at the crossing F3 does not encounter a closure period, obviously the minimum travelling time to the destination is 20 minutes.

Thus in a first embodiment, a recommended route which normally enables arrival at a destination in a minimum travelling time is indicated to a user at an arbitrary time, after consideration of the arrival time of a vehicle at a crossing and the times of closure of the crossings.

The first embodiment used the example of a railway crossing as an obstacle. However the invention is not limited in this respect and obviously may be adapted for use with a drawbridge which crosses a river.

Furthermore in the first embodiment, the moving body was taken to be an automobile. However the invention is not limited in this respect and obviously may be adapted to a ship or pedestrian.

Embodiment 2

Figure 7:
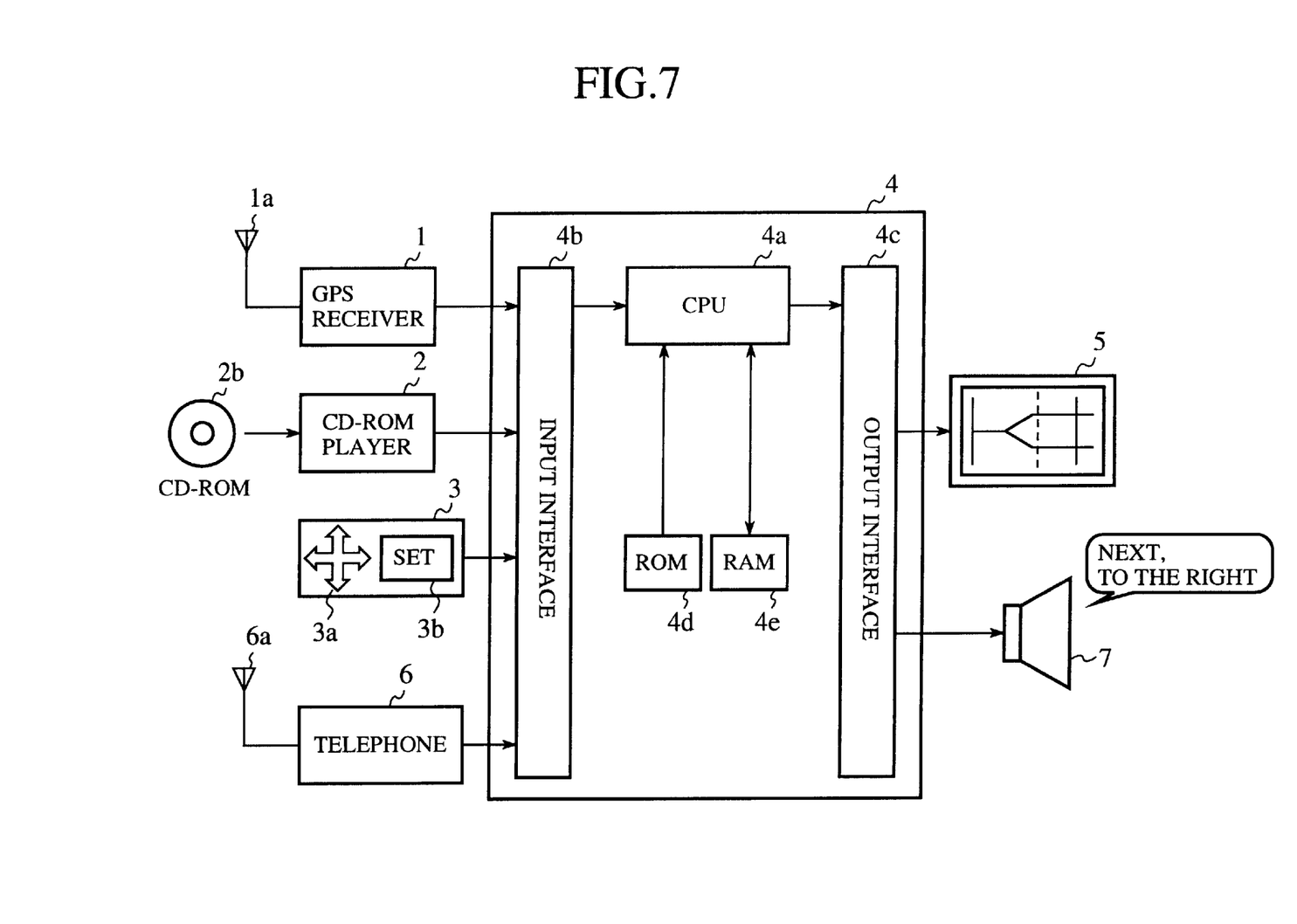
FIG. 7 is a diagram of a navigation device according to a second embodiment of the present invention.

FIG. 7 is a schematic diagram of a navigation device according to a second embodiment of the present invention. In the figures, those elements which are the same or similar to those shown in FIG. 1 are represented by the same reference numerals and their explanation will be omitted.

6 is a radio telephone (information acquisition means) which receives most recent obstacle time information with respect to crossings via the Internet from a base station (not shown) which is provided outside the mobile body. 6a is an antenna of the radio telephone 6. 7 is a speaker (indication means) which announces the recommended route.

The operation of the invention will be explained below.

In the first embodiment above, obstacle time information was read and played from a CD-ROM 2b. However obstacle time information regarding crossings need not be recorded and only map information may be recorded on such a CD-ROM 2b. Most recent information regarding crossings may be received by a radiotelephone 6 via the Internet from a base station provided outside the mobile body. (In step ST103 in FIG. 5, instead of the input from the CD-ROM player 2, most recent information about crossings may be input via the Internet.)

In the first embodiment above, the method of displaying the recommended route was by display on a LCD panel 5. In the second embodiment, the route may be indicated before arrival at critical points by voice commands such as "Turn right at the next intersection" by the provision of a speaker. In this way, safety is improved as the driver need not monitor the LCD panel 5 in order to select the route.

Other elements and operations of the embodiment are the same as those in the first embodiment.

Therefore in the second embodiment, the acquisition of crossing time information via the internet allows the calculation of a recommended route which has an accurate minimum time when timetables are interrupted by accidents or the like or when train timetables are revised. In other respects, the second embodiment is the same as the first embodiment.

As shown above, the navigation device and navigation method of the present invention is adapted for the acquisition of varying obstacle time information and displays the time related to an obstacle which is located along a road and the time required to pass the obstacle. A recommended route is calculated from a present position of a moving body to a destination at a minimum time depending on the time to negotiate the obstacle. The display of this result is adapted for use on a navigation device for a moving body which reaches a destination in a minimum time.

What is claimed is:

1. A navigation device which comprises:
    a position detection means which detects a present position of a moving body;
    a setting means which sets a destination;
    an information acquisition means which acquires obstacle time information relating to an obstacle on the route, said obstacle temporarily denying passage of said moving body on said route;
    a route searching means which searches for a route, which can be negotiated in a minimum travel time from said present position of said moving body detected by said position detection means to said destination set by said setting means, by reference to said obstacle time information acquired from said information acquisition means; and
    an indication means which indicates a recommended route searched for by said route searching means,
    wherein said route searching means includes a waiting time, said waiting time being the period from an expected arrival time at an obstacle to a time when the obstacle will allow passage, in said minimum travel time from said present position to said destination when the expected arrival time of a moving body at said obstacle is in a timeframe in which the passage of the moving body will be temporarily denied.

2. A navigation device according to claim 1, wherein said information acquisition means reads information relating to an obstacle time from a recording medium.

3. A navigation device according to claim 1, wherein said information acquisition device receives a radio signal relating to said obstacle time information.

4. A navigation device according to claim 1, wherein said obstacle corresponds to a scheduled event, during which said moving body cannot pass said obstacle.

5. A navigation device according to claim 4, wherein said obstacle time information denotes a beginning and an end of a time range during which said scheduled event is scheduled to occur.

6. A navigation device according to claim 5, wherein said route searching means calculates said waiting time as the time period from the expected arrival time at said obstacle to the end of the time range denoted by said obstacle time information.

7. A navigation device according to claim 1, wherein said obstacle is a railway crossing.

8. A navigation device according to claim 1, wherein said information acquisition means receives said obstacle time information from the Internet.

9. A navigation method which comprises the steps of:
    setting a destination and detecting a present position of a moving body;
    acquiring obstacle time information relating to an obstacle on a route which is in a timeframe which will deny passage of said moving body on said route;
    searching for a recommended route which can be negotiated in a minimum travel time from said present position of said moving body to said destination by reference to obstacle time information; and
    indicating said recommended route,
    wherein the step of searching for a recommended route includes a waiting time, said waiting time being the period from an expected arrival time at said obstacle to a time when the obstacle will allow passage, in the minimum travel time from said present position to said destination when the expected arrival time of said moving body at said obstacle is in a timeframe in which the passage of the moving body will be temporarily denied.

10. A navigation method according to claim 9, further comprising the step of reading information relating to an obstacle time from a recording medium.

11. A navigation method according to claim 9, further comprising the step of receiving a radio signal relating to said obstacle time information.

12. A navigation method according to claim 9, wherein said obstacle corresponds to a scheduled event, during which said moving body cannot pass said obstacle.

13. A navigation method according to claim 12, wherein said obstacle time information denotes a beginning and an end of a time range during which said scheduled event is scheduled to occur.

14. A navigation method according to claim 13, wherein the step of searching for a recommended route calculates said waiting time as the time period from the expected arrival time at said obstacle to the end of the time range denoted by said obstacle time information.

15. A navigation method according to claim 9, wherein said obstacle is a railway crossing.

16. A navigation method according to claim 9, wherein the step of acquiring obstacle time information receives obstacle time information from the Internet.

17. A navigation device comprising:
    a determining device for determining an optimal route from a detected location of a moving body to a set destination chosen from a plurality of eligible routes according to a shortest travel time, wherein a travel time of each eligible route includes any waiting time during which said moving body is expected to be temporarily denied passage at a predetermined location in said eligible route based on timetable information for said predetermined location and an expected time of arrival for said moving body at said predetermined location; and an output device for outputting said determined optimal route.

18. A navigation device according to claim 17, wherein said timetable information defines a time interval during which said moving body will be denied passage at said predetermined location, and said waiting time is calculated as the period of time from said expected time of arrival to the end of said time interval, when said expected time of arrival falls within said time interval.

19. A navigation device according to claim 17, wherein said determining device retrieves said timetable information from a recording medium.

20. A navigation device according to claim 17, wherein said determining device retrieves said timetable information from the Internet via radio signals.

21. A navigation device according to claim 17, wherein said predetermined location includes a railroad crossing.

22. A navigation method comprising:

detecting a location of a moving body;

setting a destination;

determining an optimal route from said detected location to said destination chosen from a plurality of eligible routes according to a shortest travel time, wherein a travel time of each eligible route includes any waiting time during which said moving body is expected to be temporarily denied passage at a predetermined location in said eligible route based on timetable information for said predetermined location and an expected time of arrival for said moving body at said predetermined location; and outputting said determined optimal route.

23. A navigation method according to claim 22, wherein said timetable information defines a time interval during which said moving body will be denied passage at said predetermined location, said determining step further including:

calculating said waiting time as the period of time from said expected time of arrival to the end of said time interval, when said expected time of arrival falls within said time interval.

24. A navigation method according to claim 20, wherein said determining step retrieves said timetable information from a recording medium.

25. A navigation method according to claim 22, wherein said determining step retrieves said timetable information from the Internet via radio signals.

26. A navigation method according to claim 22, wherein said predetermined location includes a railroad crossing.

* * * * *